April 7, 1959 S. A. STRICKLAND 2,880,495
METHOD FOR MAKING TAPERED ROLLER BEARING CONES
Filed Feb. 16, 1955 4 Sheets-Sheet 2

INVENTOR.
Silas A. Strickland
BY Barthel & Bugbee
Attys

April 7, 1959 S. A. STRICKLAND 2,880,495
METHOD FOR MAKING TAPERED ROLLER BEARING CONES
Filed Feb. 16, 1955 4 Sheets-Sheet 3

INVENTOR.
Silas A. Strickland
BY Barthel + Bugbee
Attys

April 7, 1959     S. A. STRICKLAND     2,880,495

METHOD FOR MAKING TAPERED ROLLER BEARING CONES

Filed Feb. 16, 1955     4 Sheets-Sheet 4

INVENTOR.
Silas A. Strickland
BY Barthel + Bugbee
Attys

United States Patent Office 2,880,495
Patented Apr. 7, 1959

2,880,495
METHOD FOR MAKING TAPERED ROLLER BEARING CONES

Silas A. Strickland, Detroit, Mich., assignor, by mesne assignments, to Federal-Mogul-Bower Bearings, Inc., Detroit, Mich., a corporation of Michigan Application February 16, 1955, Serial No. 488,681

8 Claims. (Cl. 29—148.4)

This invention relates to metal working and, in particular, to methods of making tapered roller bearing races.

One subject of this invention is to provide a method of making the inner race or cone of a tapered roller bearing from a flat annular blank similar to that used for making an outer race or cup thereof, thereby simplifying production by eliminating the machining operations formerly required in machining such inner races or cups from tubing or round bar stock, as well as effecting a considerable saving in steel.

Another object is to provide a method of the foregoing character wherein the inner race or cone is formed from a flat annular blank by supporting the edge of the blank over a die cavity and forcing the central portion of the blank downward into the cavity so that the lower surface of the blank is gradually brought into engagement with the side of the die cavity while the outer or upper surface thereof is gradually brought into engagement with the outer surface of a punch, the punch outer surface having the configuration finally desired for the inner surface of the bearing race without requiring further machining, the die cavity inner surface having approximately the configuration finally desired for the outer surface of the bearing race, said outer surface requiring only minor machining in order to produce the bearing race ready for heat treating and grinding.

Another object is to provide a method of the foregoing character wherein production of blanks for the inner and outer races is automatically kept in balance by producing the same flat annular blanks for both the inner and outer race of a given size of bearing concentrically from the same piece of flat sheet steel, one blank fitting inside the other, thereby eliminating the waste of steel caused by the excessive production of scrap in the prior art and also the unbalanced production of outer and inner races for different sizes of bearing as produced in the prior art by entirely different methods and machines from different shapes of blanks, so that the excess production of inner races over outer races or vice versa which formerly occurred is now eliminated.

Another object is to provide a die set and method, as set forth in the object immediately preceding, wherein the production, according to the present invention, of the outer and inner races (cups and cones) of a given size of bearing from the same flat annular blank also eliminates or at least greatly reduces the necessity of closing in or expanding the prior annular blanks as previously done in order to adapt them to the production of different sizes of races, the present invention using the first blank produced from the flat stock for the inner race or cone and the second blank for the outer race or cup of the same bearing assembly.

Other objects and advantages of the invention will become apparent during the course of the following description of the accompanying drawings, wherein.

Figure 9:
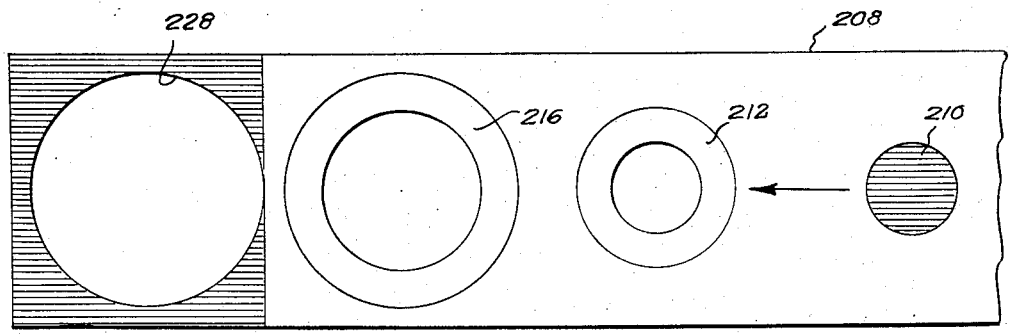
Figure 9 is a top plan view of a strip of flat bar stock from which a cup blank, cone blank and scrap disc have been punched successively, showing by shaded areas the waste metal produced.
Figure 10:
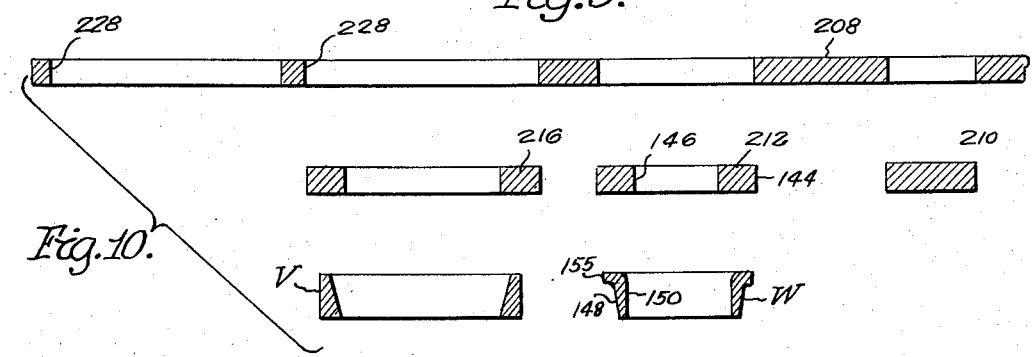
Figure 11:
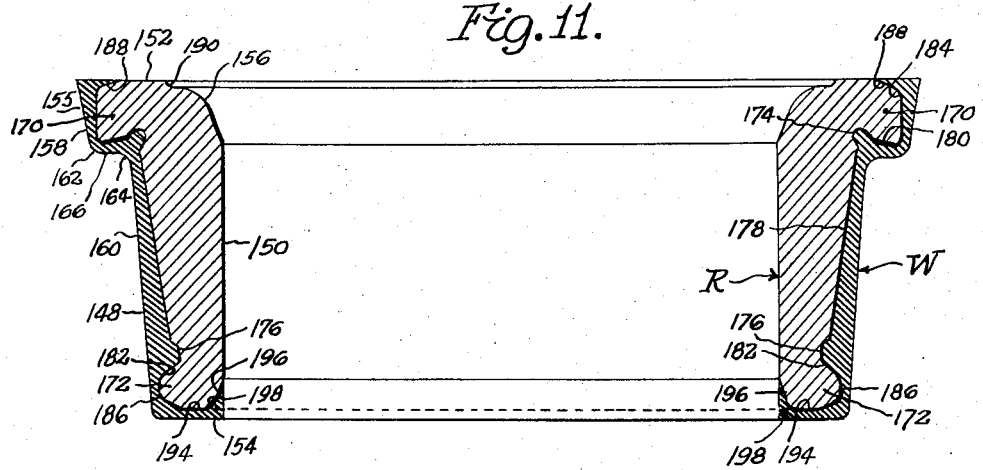

Figure 10 is an exploded central vertical section through the strip of Figure 9 showing the punched strip, the blanks and scrap disc punched therefrom, and the cup and cone workpiece bodies formed by successive operations; and Figure 11 is a central vertical section, similar to Figure 3, through the race body produced from the flat annular blank by the present invention, the heavily shaded portions indicating the metal subsequently removed by machining.

Figure 1:
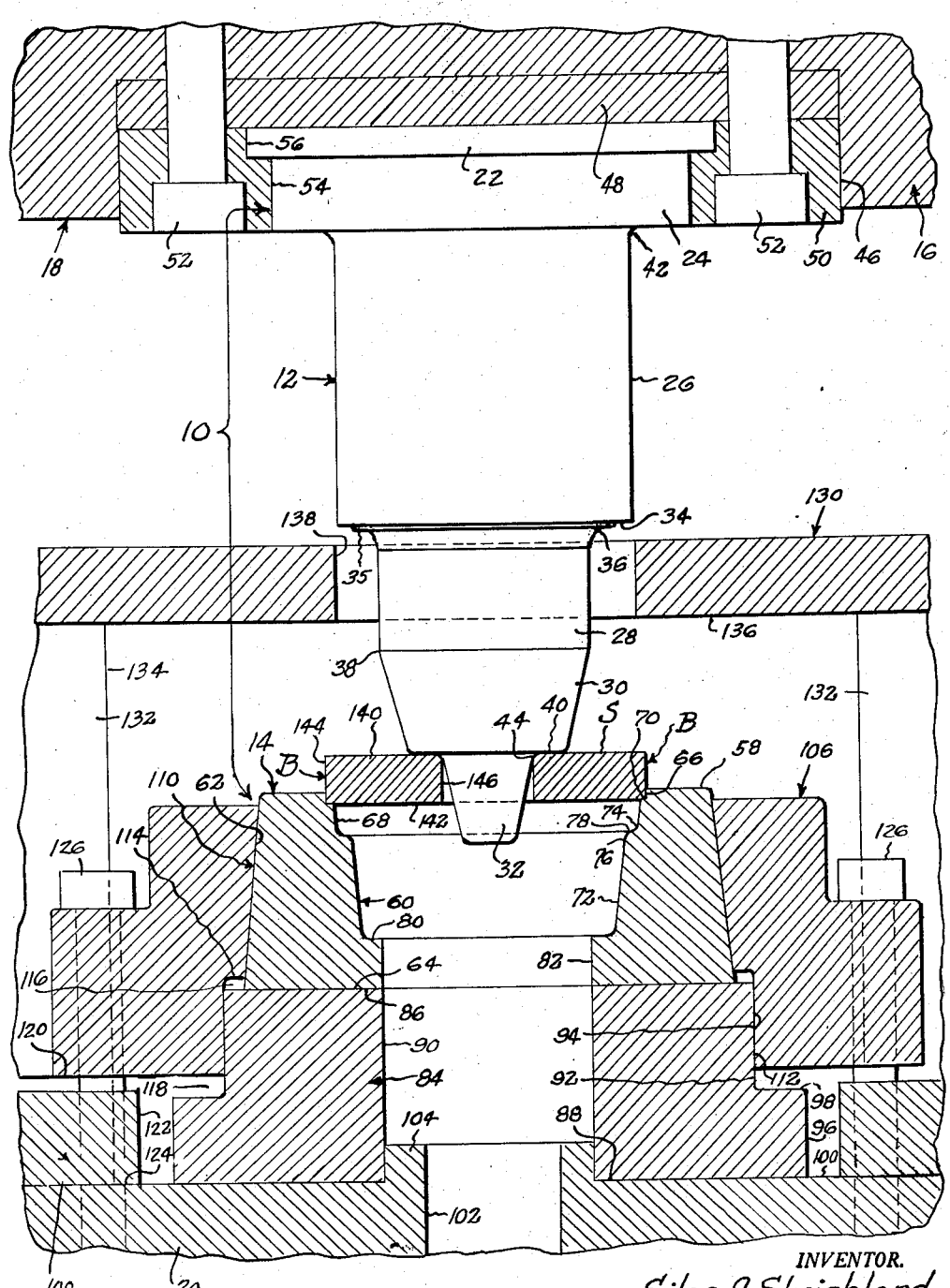
Figure 1 is a central vertical section through a die set adapted for the production of the inner race or cone of a tapered roller bearing assembly from a flat annular blank, according to the invention, at the start of the forming operation.
Figure 2:
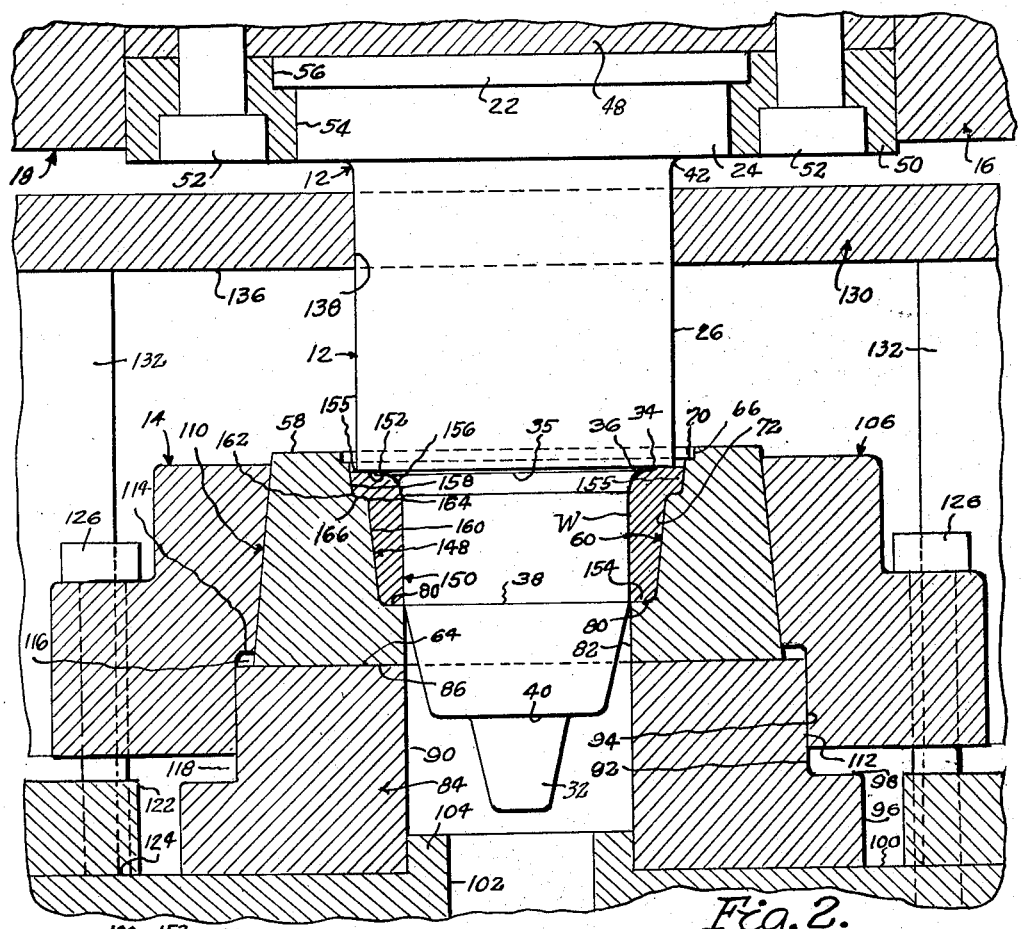
Figure 2 is a view similar to Figure 1, at the conclusion of the forming operation.

Referring to the drawings in detail, Figures 1 and 2 show a die set, generally designated 10, including a male die member or punch 12 and a female die member or die 14 for producing the race body W from which the completed inner race or cone R is finished by minor machining operations on its outer surface. The punch 12 of the die set 10 is secured to the platen 16 of a conventional press, generally designated 18, whereas the die 14 is secured to the bed 20 of the same conventional press 18.

The punch 12 consists of an elongated gradually tapered body having successively diminishing diameter portions from its upper to its lower end, namely a cylindrical flanged portion 22 immediately above a cylindrical mounting portion 24 of less diameter which in turn is immediately above a main supporting portion 26 of cylindrical form of still less diameter. Immediately below the supporting portion 26, the punch is provided with a further reduced diameter cylindrical forming portion 28 adapted to form the inner surface of the race body W. Below the cylindrical forming portion 28 is a conical forming portion 30 adapted to form the intermediate shape of the inner surface of the inner race body W, and below the conical portion 30 is a still smaller conical pilot portion 32 which projects through the central hole in the annular flat blank or stamping B from which the body W is produced.

Between the cylindrical supporting portion 26 and the cylindrical forming portion 28 is an annular radial shoulder 34, an annular stepped portion 35, and an annular toric junction surface 36. Between the cylindrical forming portion 28 and the conical forming portion 30 is a substantially shoulderless line of junction 38, whereas between the cylindrical forming portion 30 and the cylindrical pilot portion 32 is an annular radial shoulder 40. Slightly curved junctions 42 and 44 are provided between the cylindrical portions 24 and 26 and between the shoulder 40 and the conical portion 32 respectively.

The platen 16 of the press 18 is provided with a cylindrical recess or socket 46 adapted to receive a wear disc or wear plate 48 of cylindrical form and a retaining ring 50, the members 48 and 50 and the platen 16 being bored to receive bolts 52. The wear plate 48 is provided for the purpose of sustaining the buffeting to which the platen would otherwise be subjected, the wear plate 48 being replaced when necessary. The retaining ring 50 has a bore 54 and counterbore 56 for receiving the cylindrical portion 24 and flanged portion 22 respectively of the punch 12 to hold the latter firmly and solidly in engagement with the platen 16.

The die 14 is of annular form and is provided with an upper surface 58, an inner surface or die cavity, generally designated 60, and an outer conical surface 62 extending from the upper surface 58 to the lower surface 64 thereof. The die cavity 60 is in the form of a stepped surface of revolution consisting successively of a counterbore 66 joined to an upper tapered or conical surface 68 by an annular shoulder 70, a lower conical surface 72 joined to the upper conical surface 68 by upper and lower concave and convex toric surfaces 74 and 76 with an annular shoulder 78 between them, and finally an annular radial bottom surface 80 connecting the lower conical surface 72 with a cylindrical central bore 82.

The die 14 rests upon an annular support, generally designated 84, which also serves as a wear member to protect the press bed 20 in the same manner that the wear plate 48 protects the platen. The support 84 has flat upper and lower surfaces 86 and 88, a central cylindrical surface or bore 90 corresponding to and forming a continuation of the bore 82 in the die 14, and a stepped cylindrical outer surface 92 consisting of upper and lower cylindrical surfaces 94 and 96 separated from one another by an annular radial surface 98. The lower surface 64 of the die 14 rests upon the upper surface 86 of the support 84, whereas the lower surface 88 of the latter rests upon the upper surface 100 of the press bed 20. The latter has a central bore 102 of smaller diameter than the bores 82 and 90, with an upstanding annular ridge or boss 104 rising from the bed surface 100 and entering the bore 90.

The assembly of the die 14 and die support 84 is held in engagement with the press bed 20 and in axial or centered relationship with the punch 12 by an annular retaining member, generally designated 106 and a retaining member supporting plate, generally designated 108, interposed between it and the press bed 20. The retaining member 106 has an internal conical surface 110 of the same taper as the outer conical surface 62 of the die 14 and adapted to coact therewith in forcing the die 14 downward against the die support 84. Below the internal conical surface 110, the retaining member 106 is provided with a counterbore 112 which is of slightly larger diameter than the lower end of the conical bore 110 and separated therefrom by an annular radial surface 114 in order to accommodate the upper cylindrical outer surface 94 of the die support 84. An annular clearance space 116 is provided between the annular suface 114 and the upper surface 86 of the die support 84. A similar annular clearance space 118 is provided between the lower surface 120 of the retaining member 106 and the radial surface 98 of the die support 84. The bore 122 in the supporting plate 108 is also of larger diameter than the lower cylindrical outer surface of the die support 84 in order to continue the clearance space 118 downward to the surface 100 on which the lower surface 124 of the plate 108 rests.

The retaining member 106 and press bed 20 are bored to receive bolts 126 by which the assembly is held together, and by which the die 14 is forced firmly downward against the die support 84 and the latter forced downward against the press bed 20. In some press constructions, the member 20 is not actually the press bed itself but an additional plate interposed between the die support 84 and the press bed, depending upon the construction of the particular press.

In order to strip the inner race or cone body W from the die cavity 60 after the punch 12 has completed its downward stroke (Figure 2), a so-called stripper plate 130 is mounted on a support 132 having a central cavity or bore 134 of sufficient size to admit the assembly consisting of the die 14, die support 84 and retaining member 106. The lower surface 136 of the stripper plate 130 is mounted a sufficient distance above the upper surface 58 to permit extraction of the inner race body W at the conclusion of the pressing operations. The distance between the surfaces 58 and 136 must obviously be greater than the hight or axial thickness of the inner race body W in order to permit its extraction. The stripped plate 130 is provided with a central bore 138 sufficiently large to permit passage of the punch supporting surface 26 (Figure 2) but sufficiently small to intercept the workpiece W on the return stroke of the punch 12.

The flat annular blank B from which the inner race body or workpiece W is formed, has upper and lower surfaces 140 and 142 respectively, and outer and inner substantially cylindrical surfaces 144 and 146 respectively, the surfaces 144 and 142 being snugly seated in engagement with the surfaces 66 and 70 at the upper end of the die cavity 60, whereas the inner surface or bore 146 in the blank B is sufficiently large to snugly admit the conical pilot portion 32 of the punch 84 at the upper end of the bore 146. The finished workpiece W having the approximate shape of the inner race or cone of the tapered roller bearing assembly, except for the portions removed in machining, as indicated by the dotted lines in Figure 3, has outer and inner surfaces, generally designated 148 and 150 respectively (Figure 2), and upper and lower annular end surfaces 152 and 154 respectively. The upper portion of the workpiece W by this construction possesses an outwardly-projecting annular flange 155. The inner surface 150 is cylindrical for the major portion of its length and corresponds in size and configuration to the cylindrical forming surface 28 of the punch 12, and it has an annular convex toric surface 156 at its upper end where it joins the radial surface 152. The outer surface 148, on the other hand, consists of upper and lower conical surfaces 158 and 160 separated from one another by curved surfaces 162 and 164, and a connecting surface 166 corresponding in configuration to the surfaces 74, 76 and 78 of the die cavity 60.

In the operation of the die set of the invention, and in carrying out the method of the invention, let it be assumed that the punch 12 and die 14 are set up in the platen 16 and on the bed 20 of the press 18 respectively, or in an analogous manner. Let it also be assumed that a supply of annular blanks B has been punched out from flat sheet steel or other suitable material, the size of course depending upon the dimensions of the finished inner race or cone R of the tapered roller bearing assembly. The operator, having retracted the platen 16 and punch 12 to their raised positions, places a blank B in the counterbore 66 of the die cavity 60 and starts the press 18. The platen 16 and the punch 12 accordingly descend toward the blank B, as shown in Figure 1.

During the downward travel of the platen 16 and punch 12, the conical pilot portion 32 first enters the central hole 146, and continues to descend until the annular shoulder 40 between the conical portions 32 and 30 engages the portion of the upper blank surface 140 surrounding the central hole 146, pushing it downward. As the platen 16 and punch 12 continue to descend, the central portion of the blank B is pushed downward so as to cause the blank B to become cupped or dished because the periphery of its lower surface 142 is firmly held against downward movement by the annular shoulder 70 at the bottom of the counterbore 66. The annular shouldered portion 40 of the punch 12 continues to force the central portion of the blank B downward into the die cavity 60 in this manner as the punch 12 descends, at the same time enlarging the central hole 146 as the metal of the blank is stretched.

When the central hole 146 becomes sufficiently large, namely equal to the outer diameter of the annular shoulder 40, the lower end of the conical forming portion 30 enters the hole 146 and continues the pressing of the central portion of the blank B downward and outward toward the die cavity 60. The passage of the conical forming portion 30 through the constantly enlarging hole 146 from its smaller end 40 to its larger end 38 accelerates the cupping of the blank B and continues the pushing of the central portion thereof toward the conical surface 72 of the die cavity 60 while at the same time the edges of the hole 146 swing inward toward the junction of the conical surface 72 with the annular shoulder 80 at the bottom of the die cavity.

While the conical forming portion 30 has been pushing its way downward through the central hole 146 and expanding the latter, it transforms the flat blank B into a roughly conical blank with the inner walls 140 fitting the conical surface 30. The further motion of the punch 12 downward and the passing of the junction line 38 inward beyond the edge 144 causes the cylindrical portion 28 of the punch 12 to now engage the conical transformation of the upper surface 140, converting it from a conical surface to the cylindrical surface 150 (Figure 2) and at the same time the outer surface 148 becomes conical according to the taper of the conical die cavity portion 72. The walls of the former central hole 146 are pushed downward against the annular shoulder 80 at the foot of the die cavity, thereby becoming the annular bottom surface 154 of the workpiece W.

Meanwhile, after the punch 12 has proceeded downward in the above-described manner so that the bottom edge of the workpiece W approaches the annular die cavity shoulder 80, the peripheral portion of the former lower surface 142 of the blank which has now become the outer surface 158 of the workpiece, slips off the upper annular shoulder 70 and passes downward into the upper conical surface or portion 68 of the die cavity 60. Due to the annular shoulder 78, however, the presence of the expanding diameter of the conical punch portion 30 and the large diameter of its cylindrical portion 28, the peripheral portion of the blank B is halted at the shoulder 78 in the manner shown in Figure 2. When, finally, the annular shouldered portion 34 and toric curved surface 36 immediately above the cylindrical punch portion 28 comes into engagement with the periphery of the upper surface 140 of the blank B, they produce the annular upper surface 152 on the workpiece W and its curved or toric junction surface 156 with the cylindrical surface or bore 150 while the remainder of the cylindrical edge 144 of the blank B is forced against the upper conical portion 68 of the die cavity 60 and transformed into the upper conical portion 158 of the workpiece W. Thus, by the continued downward progress of the punch 12 relatively to the die 14, the flat annular blank B becomes the approximately hollow conical workpiece W with the projecting flange 155 at the top thereof. When the platen 12 reaches its lowermost position, as shown in Figure 2, the workpiece W has the cross-section indicated by the solid lines in Figure 2 and by the outermost lines, both solid and dotted, in Figure 3.

The press 18 now reverses itself, causing the platen 16 to travel upward toward the stripper plate 130, carrying with it the workpiece W by reason of the frictional engagement of its cylindrical inner surface 150 with the cylindrical outer surface 28 of the punch 12. When, however, the lower end 34 of the cylindrical supporting portion 26 reaches the lower surface 136 of the stripper plate 130, the flange 155 on the workpiece W, being larger than the bore 138 in the stripper plate 130, is incapable of passing therethrough and therefore causes the workpiece W to halt by the engagement of the opposing surfaces 136 and 152 (Figure 2). Accordingly, as the platen 12 continues to move upward, the workpiece W remains in position against the lower surface 136 of the stripper plate 130 and is accordingly stripped off the cylindrical surface 28 of the punch 12, and is removed by pushing it transversely through the space between the stripper plate lower surface 136 and the die upper surface 58. The operator then loads the die counterbore 66 with a fresh blank and repeats the foregoing procedure to produce another workpiece W.

Figure 3:
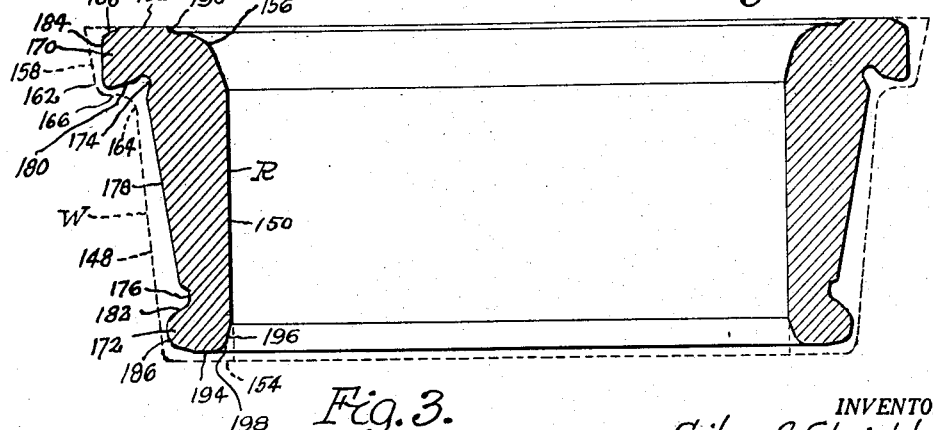
Figure 3 is an enlarged cross-section through a finished inner race or cone made according to the die set and method of Figures 1 and 2, showing in dotted lines the metal removed from the conical tubular member produced by the present invention in finally finishing the race ready for heat treatment.

To convert the workpiece W of Figure 2 into the inner race or cone R of Figure 3, another operator loads the workpiece W along with others of its kind into a multiple spindle automatic screw machine, and removes the outer portion indicated by the dotted line to produce the upper and lower flanges 170 and 172 with upper and lower grooves 174 and 176 separating them from an accurately conical race surface 178 which is engaged by the bearing rollers (not shown), the upper and lower annular shoulders 180 and 182 assisting in retaining the rollers in their proper positions on the conical working surface 178. In the same automatic screw machine, the edge surface 184 of the upper flange 170 is made substantially cylindrical and the surface 186 of the lower flange 172 substantially toric, while the upper flange 170 is beveled off at 188 to remove the corner at its junction with the upper surface 152 which remains unchanged in its central portion. The same machining operation removes any "flash" produced on the edges by the pressing operation, and produces a new bottom surface 194 by trimming off the stock at that end of the blank, formerly the end surface 154, and by flaring and rounding it slightly as at 196 and 198 respectively. The inner portion of the upper surface 152 of the cone workpiece W at the curved or toric junction 156, however, requires no machining, as the pressing operation has already provided it with a slight shoulder 190 adjacent the approximately toric surface 156 determined by the toric surface 42 of the punch 12 on the workpiece W. The result is the inner race or cone R, which is now completed except for hardening and grinding. In Figure 11, the heavily shaded areas indicate the portions of metal removed by such machining operations.

Thus, according to the invention as described above, there has been produced from a flat annular blank B similar to that used for producing the outer race, an inner race workpiece E from which the bearing cone or inner race R is produced by the slight machining and trimming operations on the external surface thereof only, as indicated by the dotted line in Figure 3. As previously stated above in the second object of the specification, the inner surface of the bearing race produced by the punch outer surface thus has the configuration finally desired for the said inner surface without requiring further machining. This die set 10 and the process carried out with its assistance enables the outer and inner races to be made from annular blanks stamped concentrically from the same area of a strip of steel of flat bar stock, as shown in Figures 9 and 10. The invention thereby eliminates the necessity for producing separate blanks on separate machines by entirely different processes as has hitherto been practiced, avoids the disadvantages thereof set forth above, and achieves the advantages and new results also set forth above.

The production of the outer race or bearing cup workpiece body V from the flat annular blank 216 is accomplished by apparatus and methods beyond the scope of the present invention, subsequent machining operations being performed on the body V to form from it the finished outer race or bearing cup (not shown).

Figure 4:
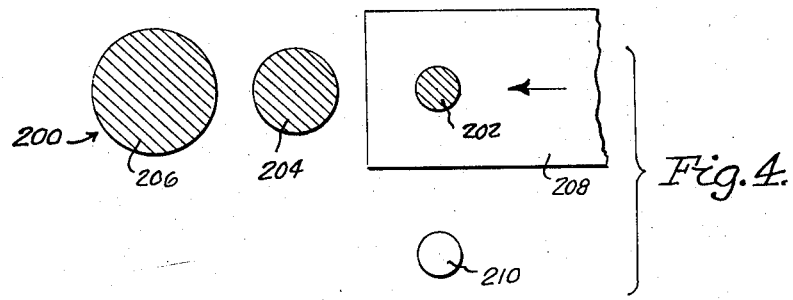
Figure 4 is a diagrammatic top plan view showing the first step in the production of annular outer and inner race blanks, resulting in the punching out of the first scrap disc.

Figures 4 to 7 inclusive show diagramatically the saving in steel, reduction in scrap and the balancing of production resulting from the present invention, by producing the cup blank and cone blank concentrically from the same piece of strip steel, one blank fitting inside the other. Figure 4 shows diagrammatically a three-station punch and die set, generally designated 200, having punches 202, 204 and 206 of successively increasing diameters for simultaneously punching out a central scrap disc, an intermediate annular cone blank and an outer annular cup blank from a piece 208 of strip steel which is successively advanced after each working stroke of the punches 202, 204 and 206. In Figure 4, the strip steel piece 208 has been advanced to the first stage in the first step, halted beneath the first punch 202 and all three punches 202, 204 and 206 reciprocated simultaneously to punch out the first scrap disc 210. At this step, the punches 204 and 206, although on a working stroke, reciprocate idly since the steel strip 208 has not yet arrived beneath them.

Figure 5:
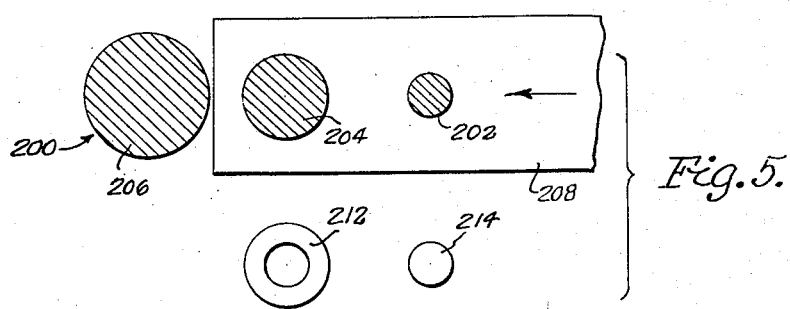
Figure 5 is a view similar to Figure 4, showing the second step, resulting in the punching out of the first cone blank and the second scrap disc.
Figure 6:
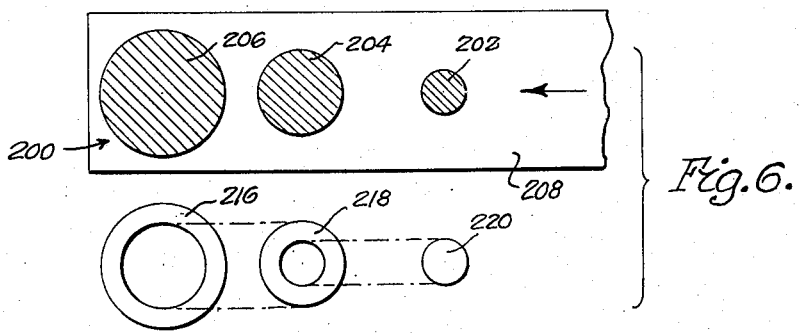
Figure 6 is a view similar to Figures 4 and 5, showing the third step, resulting in the punching out of the first cup blank, second cone blank and third scrap disc.

In Figure 5, the strip steel piece 208 has been advanced to the second stage in the second step of operation, halted beneath the first and second punches 202 and 204 and all three punches 202, 204 and 206 again reciprocated simultaneously to punch out the first cone blank 212 and the second scrap disc 214. In Figure 6, the strip steel piece 208 has been advanced to the third stage in the third step, halted beneath the third punch 206 and all three punches 202, 204 and 206 again reciprocated simultaneously to punch out the first cup blank 216, the second cone blank 218 and the third scrap disc 220.

Figure 7:
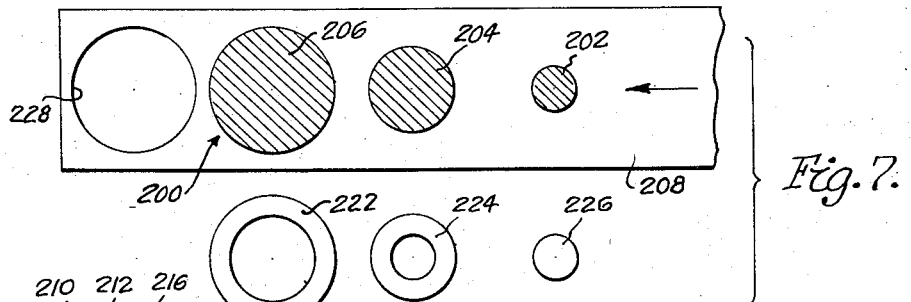
Figure 7 is a view similar to Figures 4, 5 and 6, showing the fourth step resulting in the punching out of the second cup blank, third cone blank and fourth scrap disc.

In Figure 7, the strip steel piece 208 has been advanced to the fourth stage in the fourth step, again halted beneath all three punches 202, 204 and 206 and these reciprocated simultaneously to punch out the second cup blank 222, the third cone blank 224 and the fourth scrap disc 226. The strip steel piece 208 now has holes 228 of maximum diameter from each of which a set of three concentric circular pieces has been stamped or punched, namely the scrap disc 210, the annular cone blank 212 and the annular cup blank 216, and so forth, as stated above. The cone blanks 212, 218 and 224 are the same as the cone blanks B described above earlier in this specification.

Figure 8:
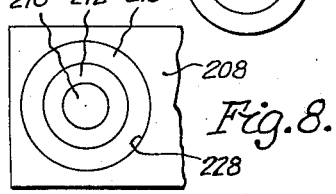
Figure 8 is a fragmentary top plan view of the forward end of a piece of strip steel from which the first cup blank, cone blank and scrap disc have been punched and then replaced for purposes of illustration to show the concentricity thereof, one inside the other.

Figure 8 illustrates the concentricity of the three pieces 210, 212 and 216 by showing that they can be placed in concentric relationship one within the other, back in the hole 228. Thus, in the present invention, only the small central disc 210 is scrap, the remaining two portions 212 and 216 being produced, in effect, from the same wide annular disc constituting the combined width of the discs 212 and 216. Moreover, by this procedure, and by the development according to the present invention of producing a bearing cone from an annular flat cone blank, the production remains always in balance.

Here it may also be stated that in the design stage of laying out the operations for the production of bearing cones and cups of particular sizes, the innermost diameter, namely that of the hole produced by punching out the scrap disc, can be varied according to the variations, for example, in different models of the same size of tapered roller bearing assembly, for example, where the central bores are of different diameters for the same size of bearing. By the same procedure, the outermost diameter, namely that of the cup blank 216, can be varied to produce different sizes of cups, as needed to meet sales requirements. In this manner, the necessary greater or lesser volume of metal can be provided for, to produce larger or smaller cups and cones. Where necessary, the outer and inner annular blanks 216 and 212 can be "closed in" or contracted to a smaller diameter by known die operations beyond the scope of the present invention, or expanded to larger diameters, also by known die operations. The present invention, of course, makes use of the inner annular blanks or cone blanks 212, 218, 222, etc., to form bearing cone workpieces W and bearing cones R as described above. For variations outside the capability of varying tthe outermost and innermost diameters of the cup and cone blanks 216 and 212 in the above manner, recourse can be had to adopting a strip steel stock 208 of greater or lesser thickness in order to produce the greater or lesser volume of metal required.

Thus, the present invention eliminates what has previously been a constant disadvantage of prior methods and machines for producing bearing cups and cones, namely the production of excessive quantities of cups for the number of cones needed, or vice versa. This results from the fact that, as stated above, for a given size of bearing, the present invention produces exactly one annular cup blank 216 and its mating cone blank 212, neither more nor less. Finally, the present invention forms the bearing cone workpiece W from an annular flat cone blank B or 210, 212, 218, 224, and so forth, from the center of the annular cup blank 216, 222, and so forth, which would otherwise be either thrown away as scrap or usable only to produce another cup, as in the prior art, resulting in unbalanced production of cups over cones.

In the past, prior to the present invention, both the inner and outer races (or cones and cups) of tapered roller bearings have usually been made from hollow cylindrical tubular stock in their larger sizes and from round steel bar stock in their smaller sizes. This tubular steel stock, however, is much more expensive than the same steel when furnished in the strip form or so-called "flat bar stock" made use of in the method of the present invention. Moreover, the cost of making the bearing races from either tubular cylindrical stock or from round bar stock was still further increased by the fact that the operations in producing both the inner and outer races from tubular cylindrical stock or round bar stock were carried out in automatic screw machines. The necessity of converting the cylindrical surfaces of the stock into the tapered or conical surfaces of the races by such machining required the removal of large amounts of stock, thereby further adding to the cost of production.

The method of the present invention, making use of the lower cost flat bar stock and requiring less machining, greatly reduces the cost not only by producing the interior of the race in its substantially completed form by pressing operations requiring no further machining except at one extreme end, but also because such pressing operations are themselves faster and cheaper than automatic screw machine operations.

In the following claims, the terms "upper" and "lower" as applied to certain surfaces are merely used for convenience and clarity in describing the procedure, such as when the die set is used in the vertical position shown in Figures 1 and 2. It will be understood, however, that if or when the die set is used horizontally, the surfaces previously referred to as upper and lower surfaces respectively become forward and rearward surfaces relatively to the punch which is operating upon them, and equivalent to said upper and lower surfaces.

What I claim is:

1. In a method of making the inner and outer races for a tapered roller bearing from concentric blanks fitting one inside the other, severing a circular disc from a strip of flat bar stock leaving a first circular hole in said strip of flat bar stock, severing a flat annular inner blank concentric with said first hole from the strip area therearound leaving a larger second circular hole in said strip, severing a flat annular outer blank concentric with said second hole from the strip area therearound leaving a still larger third circular hole in said strip, supporting the peripheral portion of said inner blank while deforming the central portion thereof at approximately room temperature into tubular form with a conical external surface by the application of force perpendicular to said central portion of said blank while maintaining said peripheral portion substantially in its original plane to form a flange thereon, and deforming said outer blank at approximately room temperature into tubular form with a substantially conical internal surface by the application of force perpendicular to the central portion of said outer blank whereby to sever both the inner race blanks and the outer race blanks for the same size and kind of bearing from concentric portions of the same area of the metal strip and produce both the inner and outer races from the inner and outer race blanks so as to balance production equally between the inner and outer races.

2. In a method of making the inner and outer races for a tapered roller bearing from concentric blanks fitting one inside the other, severing a circular disc from a strip of flat bar stock leaving a first circular hole in said strip of flat bar stock, severing a flat annular inner blank concentric with said first hole from the strip area therearound leaving a larger second circular hole in said strip, severing a flat annular outer blank concentric with said second hole from the strip area therearound leaving a still larger third circular hole in said strip, supporting the peripheral portion of said inner blank while deforming the central portion thereof at approximately room temperature into tubular form with a conical external surface by the application of force perpendicular to said central portion of said blank, and the subsequent application of an expanding force outwardly of the rim of said first hole while maintaining said peripheral portion substantially in its original plane to form a flange thereon, and deforming said outer blank at approximately room temperature into tubular form with a substantially conical internal surface by the application of force perpendicular to the central portion of said outer blank whereby to sever both the inner race blanks and the outer race blanks for the same size and kind of bearing from concentric portions of the same area of the metal strip and produce both the inner and outer races from the inner and outer race blanks so as to balance production equally between the inner and outer races.

3. In a method of making the inner and outer races for a tapered roller bearing from concentric blanks fitting one inside the other, severing a circular disc from a strip of flat bar stock leaving a first circular hole in said strip of flat bar stock, severing a flat annular inner blank concentric with said first hole from the strip area therearound leaving a larger second circular hole in said strip, severing a flat annular outer blank concentric with said second hole from the strip area therearound leaving a still larger third circular hole in said strip, supporting the peripheral portion of said inner blank while deforming the central portion thereof at approximately room temperature into tubular form with a conical external surface by the application of force perpendicular to said central portion of said blank, and the subsequent application of an expanding force to the central portion of said blank after effecting partial deformation thereof while maintaining said peripheral portion substantially in its original plane to form a flange thereon, and deforming said outer blank at approximately room temperature into tubular form with a substantially conical internal surface by the application of force perpendicular to the central portion of said outer blank whereby to sever both the inner race blanks and the outer race blanks for the same size and kind of bearing from concentric portions of the same area of the metal strip and produce both the inner and outer races from the inner and outer race blanks so as to balance production equally between the inner and outer races.

4. In a method of making the inner and outer races for a tapered roller bearing from concentric blanks fitting one inside the other, severing a circular disc from a strip of flat bar stock leaving a first circular hole in said strip of flat bar stock, severing a flat annular outer blank concentric with said first hole from the strip area therearound leaving a larger second circular hole in said strip, severing a flat annular outer blank concentric with said second hole from the strip area therearound having a still larger third circular hole in said strip, supporting the peripheral portion of said inner blank while deforming the central portion thereof at approximately room temperature into tubular form with a conical external surface by the application of force perpendicular to said central portion of said blank, and the subsequent application of an expanding force to the central portion of said blank progressively from the edge of said hole outwardly toward the margin of said blank after effecting partial deformation thereof while maintaining said peripheral portion substantially in its original plane to form a flange thereon, and deforming said outer blank at approximately room temperature into tubular form with a substantially conical internal surface by the application of force perpendicular to the central portion of said outer blank whereby to sever both the inner race blanks and the outer race blanks for the same size and kind of bearing from concentric portions of the same area of the metal strip and produce both the inner and outer races from the inner and outer race blanks so as to balance production equally between the inner and outer races.

5. In a method of making a flanged tapered roller bearing inner race, forming a substantially flat annular blank having concentric inner and outer circular edges with a width therebetween exceeding the thickness of said blank, moving the peripheral portion of said blank into an enlarged shouldered counterbore surrounding a smaller substantially conical cavity while materially deforming only the central portion thereof into said cavity by the application of force perpendicular to the plane of said blank, and thereafter forcing the deformed central portion of said blank outwardly into engagement with the cavity wall by the application of an expanding pressure to said deformed central portion while maintaining said peripheral portion substantially unchanged against the shoulder of said counterbore and substantially in its original plane whereby to form an externally-conical tubular body with an outwardly projecting transversely-disposed annular flange at one end thereof.

6. The method of claim 5, including maintaining the configuration of the internal surface of the said externally-conical tubular body henceforth unchanged from the configuration thereof established by the practice of the method steps of claim 5, and machining the external surface of the said externally-conical tubular body into the configuration ultimately desired for said external surface.

7. The method of claim 5, including maintaining the configuration of the internal surface and one end surface of the said externally-conical tubular body henceforth unchanged from the configuration thereof established by the practice of the method steps of claim 5, and machining the external surface of the said externally-conical tubular body into the configuration ultimately desired for said external surface.

8. The method of claim 5, including maintaining the configuration of the internal surface and one end surface and the intervening portion thereof between said internal surface and said last-mentioned end surface of the said externally-conical tubular body henceforth unchanged from the configuration thereof established by the practice of the method steps of claim 5, and machining the external surface of the said externally-conical tubular body into the configuration ultimately desired for said external surface.

References Cited in the file of this patent

UNITED STATES PATENTS

| Number | Name | Date |
|---|---|---|
| 1,040,274 | Chambers | Oct. 8, 1912 |
| 1,139,666 | George | May 18, 1915 |
| 1,387,638 | Bingham | Aug. 16, 1921 |
| 1,444,511 | Limont | Feb. 6, 1923 |
| 1,955,195 | Lothrop | Apr. 17, 1934 |
| 1,967,821 | Hess | July 24, 1934 |
| 2,009,644 | Zimmerman et al. | July 30, 1935 |
| 2,191,916 | Schreiber | Feb. 27, 1940 |
| 2,267,229 | Zimmerman | Dec. 23, 1941 |
| 2,384,444 | Cravener | Sept. 11, 1945 |